United States Patent
Uozumi et al.

(10) Patent No.: US 10,274,076 B2
(45) Date of Patent: Apr. 30, 2019

(54) JOINTED COMPONENT, METHOD FOR MANUFACTURING THE SAME, AND COMPACTING DIE ASSEMBLY

(71) Applicant: Sumitomo Electric Sintered Alloy, Ltd., Takahashi-shi (JP)

(72) Inventors: Masato Uozumi, Itami (JP); Yosuke Kimura, Itami (JP)

(73) Assignee: Sumitomo Electric Sintered Alloy, Ltd., Takahashi-shi (JP)

( * ) Notice: Subject to any disclaimer, the term of this patent is extended or adjusted under 35 U.S.C. 154(b) by 272 days.

(21) Appl. No.: 15/126,711

(22) PCT Filed: Feb. 2, 2015

(86) PCT No.: PCT/JP2015/052824
§ 371 (c)(1),
(2) Date: Sep. 16, 2016

(87) PCT Pub. No.: WO2015/141299
PCT Pub. Date: Sep. 24, 2015

(65) Prior Publication Data
US 2017/0108114 A1    Apr. 20, 2017

(30) Foreign Application Priority Data
Mar. 17, 2014 (JP) .................. 2014-053469

(51) Int. Cl.
*B22F 3/03* (2006.01)
*B22F 3/16* (2006.01)
(Continued)

(52) U.S. Cl.
CPC ............. *F16H 57/082* (2013.01); *B22F 3/03* (2013.01); *B22F 3/16* (2013.01); *B22F 7/062* (2013.01);
(Continued)

(58) Field of Classification Search
CPC .... F16H 57/082; B22F 3/03; B22F 2003/033; B30B 11/02; B30B 11/027
See application file for complete search history.

(56) References Cited

U.S. PATENT DOCUMENTS 7,829,015 B2 * 11/2010 Kuplen ................. B22F 3/03
419/5
9,249,830 B2 * 2/2016 Mouri ................... B22F 5/106
(Continued)

FOREIGN PATENT DOCUMENTS

CN    102029392 A    4/2011
JP    H01-111804 A   4/1989
(Continued)

OTHER PUBLICATIONS

Notification of Reasons for Rejection in Japanese Patent Application No. 2014-053469 dated Apr. 28, 2015.
(Continued)

*Primary Examiner* — Jonathan P Masinick
(74) *Attorney, Agent, or Firm* — Baker Botts L.L.P.; Michael A. Sartori

(57) ABSTRACT

Provided is a jointed component (A) in which a first member (10) and a second member (20) in which a pillar (22) stands erect on a surface of a base (21) are fixed to each other, the second member. The jointed component includes the first member and the second member including the base and the pillar disposed on the first surface of the base. The pillar is brought into contact with the first member in an axial direction. The second member includes a positioning surface (23) that has a height difference from an end surface of the second member in the axial direction and the second member includes a curved surface at a ridge between the positioning surface and a side surface of the pillar.

4 Claims, 3 Drawing Sheets

(51) Int. Cl.
*F16H 57/08* (2006.01)
*B30B 11/02* (2006.01)
*B22F 7/06* (2006.01)
*B23K 1/00* (2006.01)

(52) U.S. Cl.
CPC ............ *B23K 1/0008* (2013.01); *B30B 11/02* (2013.01); *B30B 11/027* (2013.01); *B22F 2003/033* (2013.01)

(56) References Cited

U.S. PATENT DOCUMENTS

| | | | | |
|---|---|---|---|---|
| 9,802,252 | B2* | 10/2017 | Nakatani | .................... B22F 3/03 |
| 2011/0076175 | A1* | 3/2011 | Tokoi | ........................ B22F 3/03 |
| | | | | 419/66 |
| 2013/0038420 | A1* | 2/2013 | Uozumi | .................... H01F 3/08 |
| | | | | 336/233 |

FOREIGN PATENT DOCUMENTS

| | | |
|---|---|---|
| JP | 06-037644 B2 | 5/1994 |
| JP | 2000-109907 A | 4/2000 |
| JP | 3585743 B2 | 11/2004 |
| JP | 2004-347107 A | 12/2004 |
| JP | 2008-545938 A | 12/2008 |
| JP | 2009-113103 A | 5/2009 |
| JP | 2010-064130 A | 3/2010 |
| JP | 2011-073028 A | 4/2011 |

OTHER PUBLICATIONS

International Search Report in International Application No. PCT/JP2015/052824 dated Apr. 28, 2015.
Notification of Reasons for Rejection in Japanese Patent Application No. 2014-053469 dated Aug. 28, 2015.

\* cited by examiner

JOINTED COMPONENT, METHOD FOR MANUFACTURING THE SAME, AND COMPACTING DIE ASSEMBLY

TECHNICAL FIELD

The present invention relates to a jointed component, such as a planetary carrier, acquired by fixing together two members manufactured by powder metallurgy or other methods, a method for manufacturing the jointed component, and a compacting die assembly.

BACKGROUND ART

Planetary carriers such as the one used for automatic transmission are manufactured by powder metallurgy for reduction of the manufacturing costs.

In powder metallurgy, planetary carriers are manufactured by sintering a first compact and a second compact, which are made of powder, in the state where the first and second compacts are superposed one on the other and concurrently joining the first and second compacts together by soldering.

A pillar stands erect on a surface of a plate-shaped base of the second compact. The second compact is placed below and the first compact is mounted at the tip of the pillar directed upward. The second compact and the first compact are joined together after joint surfaces of the pillar and the first compact are caused to be impregnated with solder.

This method for manufacturing planetary carriers is described in, for example, PTLs 1 and 2.

CITATION LIST

Patent Literature

PTL 1: Japanese Examined Patent Application Publication No. 6-37644
PTL 2: Japanese Patent No. 3585743

SUMMARY OF INVENTION

Technical Problem

Manufacturing planetary carriers described above requires high positioning accuracy with regard to a distance between the bases of the first compact and the second compact.

Here, according to the existing methods for manufacturing planetary carriers described in, for example, PTLs 1 and 2, the accuracy of the distance between the bases of the first compact and the second compact is determined by the accuracy of the length of the pillar provided to the second compact.

The second compact is formed by a method in which, during compacting of a powder material, the surface of the base on which the pillar is disposed is formed by a second lower punch, the tip of the pillar is formed by a first lower punch disposed around the periphery of the second lower punch, and the surface of the base on which the pillar is not disposed is formed by an upper punch.

The accuracy of the length of the pillar acquired by this method is dependent on the relative positions of the first lower punch and the second lower punch in the axial direction (relative positions of forming portions of both punches).

The relative positions of the first lower punch and the second lower punch in the axial direction vary depending on factors such as errors in assembly of these punches or deformation or deflection of the punches due to a compacting load. In the case where the first lower punch is segmented into multiple segments in accordance with the number of pillars of the second compact, the degrees of deformation or deflection of the each segments of the first lower punch may vary from one another.

This variance between the relative positions of the first lower punch and the second lower punch, which inevitably occurs due to installation reasons, varies the lengths of the pillars, so that the accuracy of the distance between the bases of the first compact and the second compact is rendered unstable.

In order to enhance product reliability, an object of the present invention is to prevent the variance of the relative positions of a first lower punch and a second lower punch in an axial direction from affecting the accuracy of the dimensions of a carrier, such as a distance between bases of a first compact and a second compact.

Solution to Problem

In order to achieve the above-described object, the following devices are made in a method for manufacturing a jointed component in which a first member and a second member in which a pillar stands erect on a surface of a base are fixed together.

Specifically, a method for manufacturing a jointed component includes a forming process of forming a positioning surface on an end surface of the second member using a punch that forms an end surface of the base of the second member on which a pillar is disposed, the positioning surface having a height difference from the end surface of the second member in an axial direction and a jointed process of bringing the positioning surface into contact with the first member in the axial direction so that the first member and the second member are fixed to each other.

The second member formed by this method includes a positioning surface that has a height difference from the end surface of the second member in the axial direction and the second member includes a curved surface at a ridge between the positioning surface and a side surface of the pillar.

The present invention provides a method for manufacturing a jointed component by fixing the second member formed in the above-described method to the first member by determining the relative positions of the first and second members in an axial direction using the positioning surface. The present invention also provides a jointed component manufactured by this method.

A compacting die assembly includes an upper punch, a first lower punch, a second lower punch, and a die. The second lower punch includes a forming portion that forms an end surface of a base of a second member on which a pillar is disposed and a positioning-surface forming portion that forms a positioning surface on an end surface of the second member, the positioning surface having a height difference from the end surface of the second member in an axial direction. The first lower punch forms an end surface of the pillar.

When a second member including a base having a through hole is to be formed, this compacting die assembly additionally includes a core rod for forming the through hole.

Advantageous Effects of Invention

According to the above-described jointed component, the above-described method for forming the same, and the above-described compacting die assembly, the accuracy of the distance from the end surface of the base of the second member on which the pillar is disposed to the end surface of the first member is rendered stable.

DESCRIPTION OF EMBODIMENTS

Referring now to FIG. 1 to FIG. 8, attached below, embodiments of a jointed component, a method for manufacturing the jointed component, and a compacting die assembly according to the present invention are described below.

Figure 1:
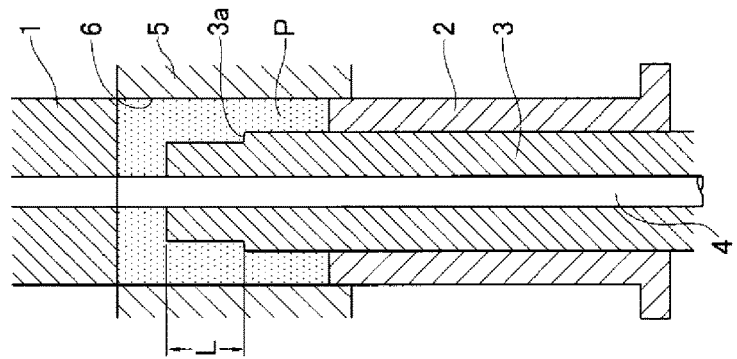
FIG. 1 is a cross-sectional view illustrating the state where a powder is injected during a second-member forming step.
Figure 2:
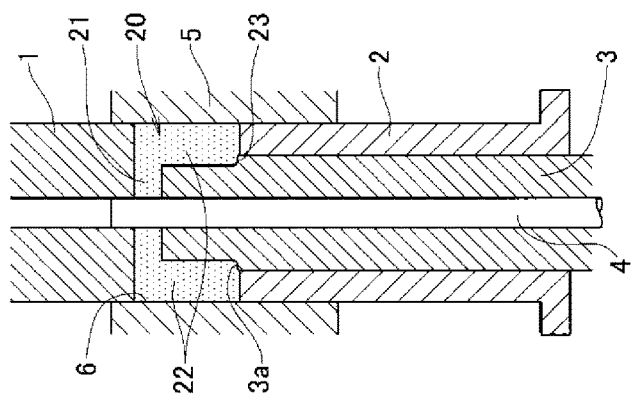
FIG. 2 is a cross-sectional view illustrating the state where compacting is finished in the second-member forming step.
Figure 3:
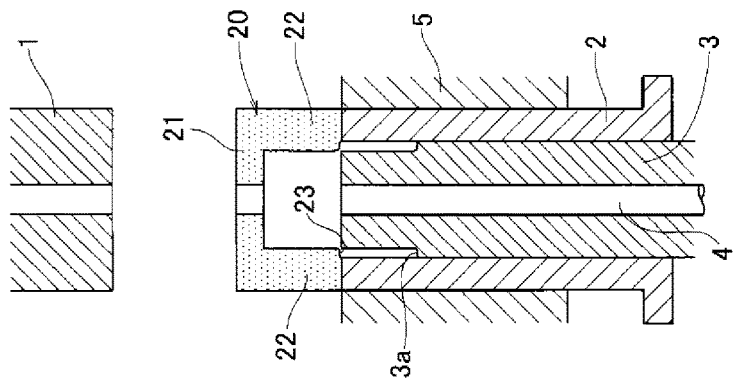
FIG. 3 is a cross-sectional view illustrating the state where the second member (compact) acquired in the second-member forming step is ejected from a die assembly.

FIG. 1 to FIG. 3 illustrate a die assembly for forming a second member (which is a powder compact) used in powder metallurgy and a process of forming the second member using the die assembly. Throughout the drawings, 1 denotes an upper punch, 2 denotes a first lower punch, 3 denotes a second lower punch, 4 denotes a core rod that extends through the center of the second lower punch 3, and 5 denotes a die.

In the exemplified forming process, compacting is performed by injecting a powder material P into a cavity 6, which is defined by the die 5, the first lower punch 2, the second lower punch 3, and the core rod 4 illustrated in FIG. 1, and then lowering the upper punch 1.

Figure 4:
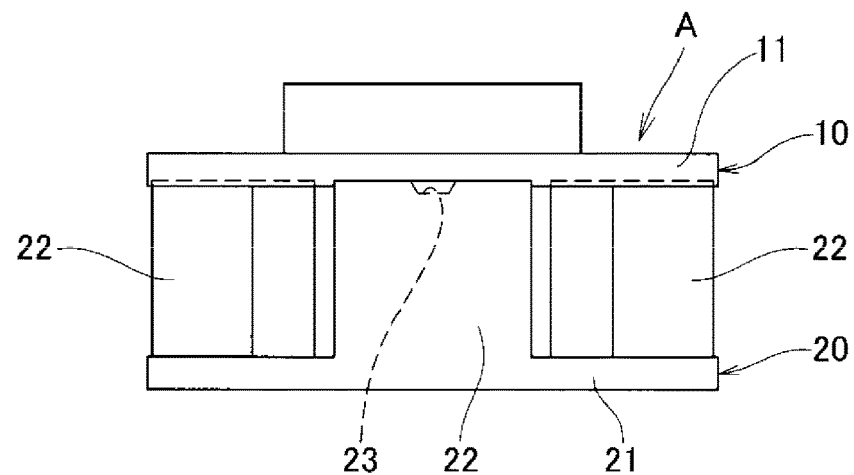
FIG. 4 is a side view schematically illustrating an example of the jointed component according to the present invention.
Figure 5:
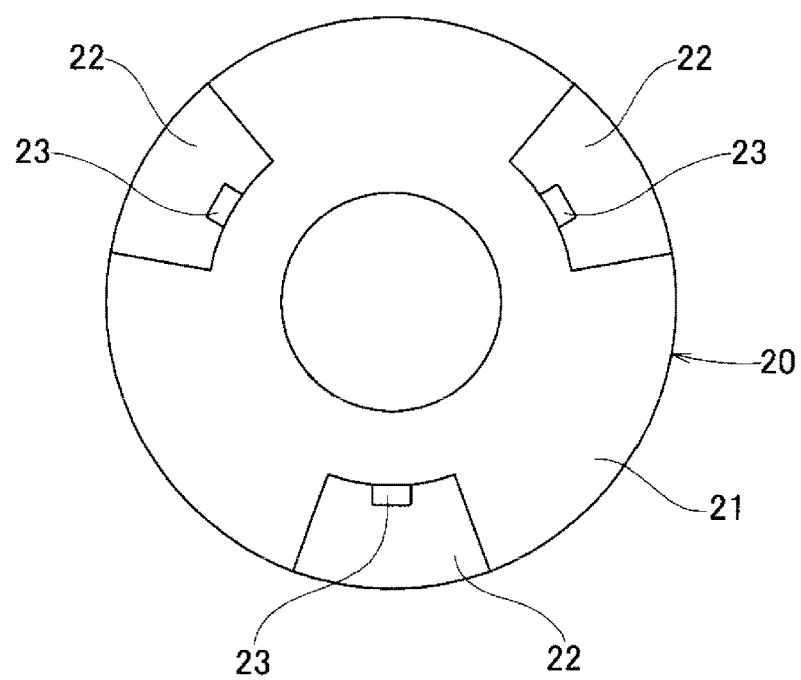
FIG. 5 is a plan view of a second member of the jointed component illustrated in FIG. 4.

Here, the second lower punch 3 forms the surface of a base 21 of a second member 20 illustrated in FIG. 4 on which pillars are disposed, the internal-diameter side surfaces of multiple pillars 22, standing erect on the first surface of the base 21 while being spaced apart from one another in the circumferential direction, and the circumferential side surfaces of the pillars 22.

In addition, positioning surfaces 23 of the pillars 22 are formed by the second lower punch 3.

The top end surface of each pillar 22 is formed by the first lower punch 2. The surface of the base 21 on which the pillars are not disposed is formed by the upper punch 1. A center hole in the base 21 is formed by the core rod 4. The outer circumference of the second member 20 is formed by the die 5.

FIG. 2 illustrates the state after the completion of compacting. FIG. 3 illustrates the state where the acquired second member 20 is ejected from the die assembly.

The pillar forming portion of the second lower punch 3 forms a positioning surface 23, which has a height difference from the top end surface of the pillar 22 formed by the first lower punch 2. The position of the second member 20 relative to a first member 10, which is also a powder compact, (see FIGS. 4 and 6) is determined with respect to the positioning surface 23.

In FIG. 1 to FIG. 3, the symbol 3a denotes a forming portion that forms the positioning surface 23 (see FIG. 3 to FIG. 5) used as a reference for positioning. A distance L (see FIG. 1) from the tip of the second lower punch 3 to the forming portion 3a is determined in conformance with the dimension required between the base 21 of the second member 20 and a base 11 of the first member 10.

The distance L is a distance between forming surfaces of the same punch. Thus, the distance L is not affected by the variance of the relative positions of the first lower punch 2 and the second lower punch 3 in the axial direction in the forming process.

Thus, the distance from the base 21 of the second member 20 to the positioning surface 23 is determined by the distance L of the second lower punch 3 without being affected by the variance of the relative positions of the first lower punch 2 and the second lower punch 3 in the axial direction in the forming process.

Figure 6:
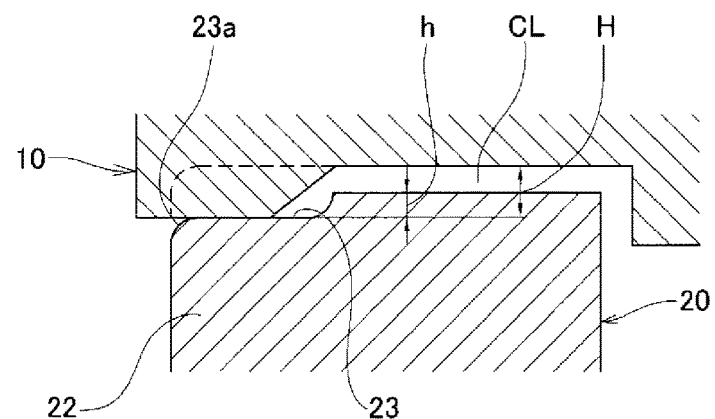
FIG. 6 is an enlarged cross-sectional view of an example of a positioning portion that determines the positions of a first member and a second member.

Thus, by bringing the positioning surface 23 into contact with the first member 10 as illustrated in FIG. 6, the dimension between the base of the second member 20 and the base of the first member 10 is prevented from being affected by the variance of the relative positions of the first lower punch and the second lower punch. Thus, the dimension between the bases is prevented from being varied. In this example, the first member 10 has a protrusion so shaped as to correspond to the shape of the positioning surface 23.

The positioning surface 23 illustrated in FIG. 6 is set back from the tip of the pillar 22. However, the positioning surface 23 may protrude beyond the tip of the pillar 22. The shape of the positioning surface 23 is not limited to a horizontally flat surface. The positioning surface 23 may be a slope, a curved surface, or a combination of these.

The forming portion 3a of the second lower punch 3 that forms the positioning surface 23 is provided with a curved surface, such as a corner R, for a preventive against stress concentration. Thus, the positioning surface 23 formed by the forming portion has a curved surface 23a, formed by impressing the shape of the curved surface of the die assembly being impressed thereon, at the corner between the positioning surface 23 and the side surface of each pillar (corner open to the inner diameter side of the pillar 22 in the example) as illustrated in FIG. 6.

Forming the curved surface 23 can thus avoid interfering with the first member.

Preferably, the second member 20 has three or more positioning surfaces 23 at positions spaced apart from one another in the circumferential direction (preferably at a predetermined pitch). When the second member 20 has three or more positioning surfaces 23, the second member 20 and the first member 10 are allowed to be stably brought into contact with each other while their axes are prevented from tilting.

The positioning surfaces 23 having a small area are preferable. This is because, if the same punch has multiple forming surfaces that have a large area and that have large height differences from one another in the axial direction, the amount of compression of the punch during compacting differs to a large extent in the axial direction and the portions of the component formed by the forming surfaces having the height differences from one another cause density variations.

If each positioning surface 23 has a small area, the compacting pressure causes a powder material to flow into a portion at which the amount of compression of the punch in the axial direction is smaller (the portion corresponding to the portion at which the positioning surface 23 is formed) than in the other portions. Thus, the component is prevented from having large variations in compacting density.

FIG. 4 illustrates a jointed component A, which is a planetary carrier formed by combining a first member 10 and a second member 20, which are sintered bodies.

This planetary carrier is manufactured by joining the first member 10 and the second member 20 together by soldering during sintering.

As described above, in solder joining, the second member 20 is placed below and the first member 10 is mounted at the tip of the pillar 22 directed upward. The second member 20 and the first member 10 are introduced into a furnace and joined together after joint surfaces of the pillar 22 and the first member 10 are caused to be impregnated with solder.

At this time, as illustrated in FIG. 6, the positions of the first member 10 and the second member 20 in the axial direction are determined in such a manner that the positioning surfaces 23 formed in the pillars 22 of the second member 20 are brought into contact with the first member 10.

In consideration of estimate variance of the relative positions of the first lower punch 2 and the second lower punch 3 in the axial direction, the height difference h between the tip of the pillar 22 formed by the first lower punch 2 and the positioning surface 23 is determined so that the positioning surface 23 is prevented from losing touch with the first member 10 in the state where the tip of the pillar 22 is in contact with the first member 10.

A clearance CL between joint portions of the first member 10 and the second member 20 (clearance between the tip of the pillar 22 and the first member 10) is determined so that the portion around the clearance is impregnated with melt solder due to the capillary phenomenon even when the relative positions of the first lower punch 2 and the second lower punch in the axial direction vary within the estimate range.

The joint portion of the first member 10 is set back, by a distance H, from the portion of the first member 10 with which the positioning surface 23 of the second member is brought into contact. By determining the recessed amount H so as to be larger than or equal to the maximum value of the height difference h of the positioning surface 23, the clearance for allowing solder impregnation is ensured.

Thus far, a sintered planetary carrier manufactured by powder metallurgy advantageous in terms of mass production and costs is described as an example. However, a jointed component according to the present invention may alternatively be manufactured by forging or injection molding. Effects of the present invention on products formed by forging or injection molding are also expected because the dimension between the bases of the second member and the first member presumably varies due to a cause such as errors that occur during assembly of the die assembly.

Figure 7:
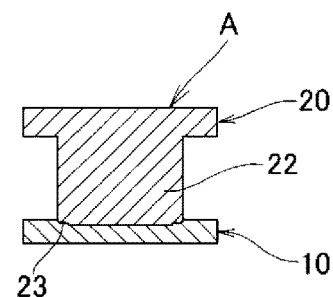
FIG. 7 is a cross-sectional view of another example of a jointed component according to the present invention.

As illustrated in FIG. 7, the present invention may be applied to a product in which a pillar 22 (or may be multiple pillars) is disposed on the inner side of the base 21 of the second member 20 in the radial direction.

Figure 8:
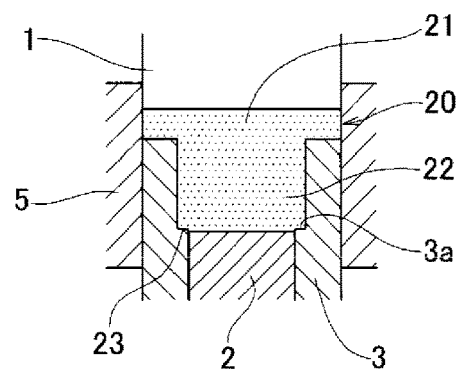
FIG. 8 is a cross-sectional view illustrating a method for forming a second member of the jointed component illustrated in FIG. 7.

As illustrated in FIG. 8, the second member 20 of the jointed component A illustrated in FIG. 7 is formed in such a manner that the first lower punch 2 is disposed on the inner side of the second lower punch 3 and the tip of the pillar 22 is formed by the first lower punch 2.

The second lower punch 3, including a positioning-surface forming portion 3a at a portion in the middle of the second lower punch 3 in the longitudinal direction, forms the end surface of the base 21 of the second member 20 on which the pillar is disposed and a portion of the tip of the pillar 22 (positioning surface 23).

In the case of a jointed component having one pillar 22 as illustrated in FIG. 7, three or more positioning surfaces 23 are preferably formed on the end surface of the pillar 22 so that the axes of the first member and the second member are prevented from tilting. The first member 10 and the second member 20 are fixed to each other while the positioning surfaces 23 are designed to be always brought into contact with the first member 10.

For the same reason, a jointed component including two pillars 22 at positions symmetrical about the center preferably has three or more positioning surfaces 23.

A method for fixing the first member and the second member to each other is not limited to soldering. Effects of the present invention are also exerted on a jointed component obtained by fixing the first member and the second member to each other by other methods such as diffusion bonding, adhesion, or mechanical fastening.

Effects of the present invention are also exerted on jointed components manufactured by forging or injection molding because the dimension between the bases of the second member and the first member of the jointed components presumably varies due to errors that occur during assembly of the die assembly.

The counterpart portion with which the positioning surface of each pillar of the second member is brought into contact does not have to be a plate. The positions of the first member and the second member may be determined by bringing a pillar into contact with another pillar.

In this form, the positioning surfaces of both pillars may be brought into contact with each other by forming, using the second lower punch that forms the end surface of the base of each member, a positioning surface recessed from the tip of the pillar on one of the first member and the second member, forming a positioning surface protruding from the tip of the pillar on the other one of the first member and the second member, and fitting the protruding positioning surface of one of the pillars into the recessed positioning surface of the other pillar.

REFERENCE SIGNS LIST 1 upper punch
2 first lower punch
3 second lower punch
3a positioning-surface forming portion
4 core rod
5 die
6 cavity
10 first member
11 base
20 second member
21 base
22 pillar
23 positioning surface
23a curved surface at corner
A jointed component
P powder material
L distance L from tip of second lower punch to positioning-surface forming portion
h height difference between tip of pillar and positioning surface H amount by which joined surface of first member is recessed CL clearance between joint portions of first member and second member

The invention claimed is:

1. A jointed component in which a first member and a second member in which a pillar stands erect on a surface of a base are fixed to each other, the jointed component comprising:

the first member; and the second member including the pillar disposed on the surface of the base, the pillar being brought into contact with the first member in an axial direction, wherein a top of the pillar includes a positioning surface that has a height difference from an end surface of the second member in the axial direction, wherein, in a cross-sectional view of the pillar in an axial direction of second member, the second member includes a curved surface at a ridge between the positioning surface and a side surface of the pillar, and wherein, in a top view of the pillar, the positioning surface is disposed on an internal-diameter side of the pillar.

2. The jointed component according to claim 1, wherein the first member and the second member are sintered bodies and solder is disposed between the first member and the pillar.

3. A method for manufacturing a jointed component in which a first member and a second member in which a pillar stands erect on a surface of a base are fixed to each other, the method comprising:

a forming process of forming a positioning surface on a top of the pillar using a punch that forms an end surface of the base of the second member on which the pillar is disposed, the positioning surface having a height difference from the end surface of the second member in an axial direction; and a jointed process of bringing the positioning surface into contact with the first member in the axial direction so that the first member and the second member are fixed to each other, wherein, in a top view of the pillar, the forming process forms the positioning surface on an internal-diameter side of the pillar.

4. A compacting die assembly comprising an upper punch, a first lower punch, a second lower punch, and a die, wherein the second lower punch includes a forming portion that forms an end surface of a base of a second member on which a pillar is disposed and a positioning-surface forming portion that forms a positioning surface on a top of the pillar, the positioning surface having a height difference from the end surface of the second member in an axial direction, wherein the first lower punch forms an end surface of the pillar, and wherein the second lower punch includes the forming portion in a position that forms the positioning surface on an internal-diameter side of the pillar.

* * * * *